Sept. 4, 1928.
R. H. CHILTON
SPRING SHACKLE
Filed April 22, 1927
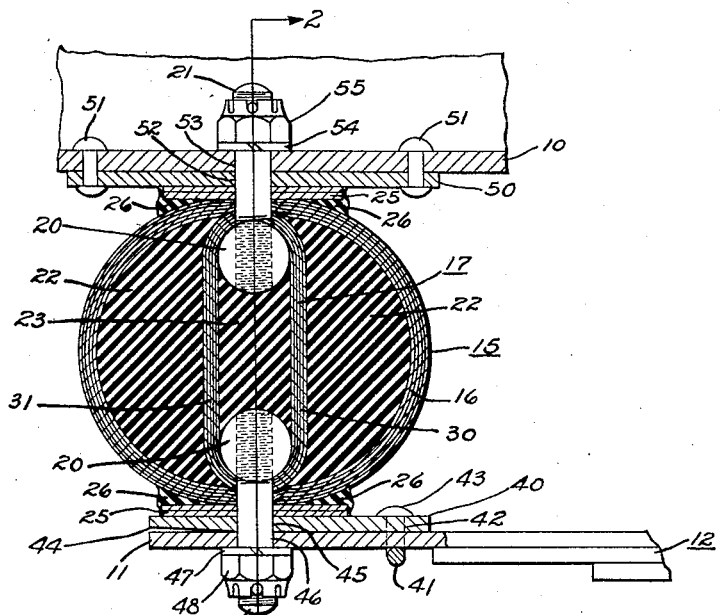
Fig. 1.
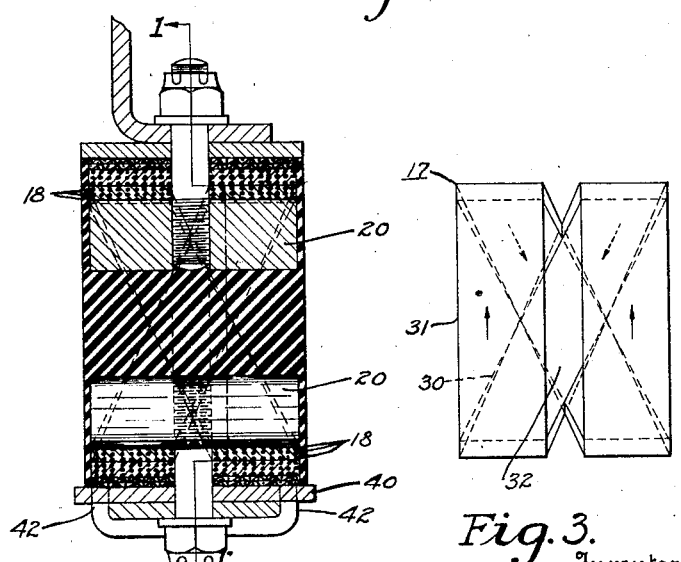
Fig. 2.
Fig. 3.
Inventor
Ralph H. Chilton
By Spencer Hardman & Fehr
his Attorneys Patented Sept. 4, 1928.

1,683,332

UNITED STATES PATENT OFFICE.

RALPH H. CHILTON, OF DAYTON, OHIO, ASSIGNOR TO THE INLAND MANUFACTURING COMPANY, OF DAYTON, OHIO, A CORPORATION OF DELAWARE.

SPRING SHACKLE.

Application filed April 22, 1927. Serial No. 185,707.

This invention relates to flexible couplings, especially such as are adapted for use as spring shackles on automobiles.

An object of this invention is to provide an improved form of flexible coupling having improved efficiency in operation and long life in use.

My copending application Serial No. 179,361, filed March 29, 1927, discloses and claims a shackle somewhat similar to that of the present invention both in objects sought and manner of obtaining said objects.

The present invention however provides an interior transverse flexible member which is materially different from that of said prior application. A feature of this transverse web is its angularly extending cords in a transverse direction whereby lateral movement or "side sway" between the parts connected by the shackle will be limited or substantially prevented. Another feature thereof is that it provides these angularly extending cords in opposed diagonal directions, and also provides straight vertical cords for taking direct tension loads on the shackle.

Further objects and advantages of the present invention will be apparent from the following description, reference being had to the accompanying drawings wherein a preferred embodiment of one form of the present invention is clearly shown.

In the drawings:

Fig. 1 illustrates a shackle built according to this invention mounted on the rear end of the front spring of an automobile chassis. The vertical section is taken on line 1—1 of Fig. 2.

Fig. 2 is a transverse section taken on line 2—2 of Fig. 1.

Fig. 3 is a diagrammatic view illustrating how the separate plies of the transverse flexible looped web may be wrapped up over one another to form the complete looped web in endless form.

Similar reference characters refer to similar parts throughout the drawings.

Numerals 10 and 11 designate the two relatively movable members connected by the shackle, 10 being the chassis side rail or fitting rigidly fixed thereto, and 11 the projecting end of the long leaf of spring 12. The molded unit, indicated as a whole by numeral 15, comprises a flexible cylindrically shaped endless rubberized fabric casing 16 which preferably is composed of a plurality of layers of rubberized cord-fabric with the substantially non-extensible cords thereof running peripherally around the casing. Extending interiorly and transversely across the cylindrical casing 16 is the separately formed endless flexible rubberized fabric loop 17 having a plurality of plies of the fabric material. The molded in situ metal clamping inserts 20 have shanks 21, integral therewith or rigidly fixed thereto, which project outwardly through suitable apertures in the flexible loop 17 and cylindrical casing 16, as clearly shown. After casing 16 is formed the separately formed loop 17 may be inserted in position therein and then the metal inserts 20 inserted in place from the inside of loop 17 by extending shanks 21 through the apertures provided therefor. Unvulcanized rubber material in plastic form is then inserted in place to fill the interior spaces 22 and 23 as will be readily understood by those skilled in the art. This rubber material is of such composition that when the molded unit comes from the vulcanizing mold the rubber blocks 22 and 23 will be elastic rubber of the desired softness such as to permit easy rolling distortion of the molded unit but still capable of sustaining the compressive load upon the shackle without excessive bulging out at the unconfined lateral sides thereof. These elastic rubber blocks 22 and 23 are of course firmly vulcanized to the casing 16 and to both webs of loop 17 and this tends to limit the above described lateral bulging of the elastic rubber when under compression. Preferably there are integrally molded upon the above described unit the relatively stiff rubberized fabric seats 25 and the wedge shaped spaces 26 between the seats 25 and the casing 16 are filled with soft elastic rubber molded in place. This molded unit 15 is vulcanized as a whole in a suitable vulcanizing die mold, the desired degree of softness or hardness of the rubber in various portions thereof being determined by the amounts of sulphur and accelerator in the unvulcanized rubber composition used in the various portions of said unit. By this means the soft rubber portion 23 may be vulcanized to a harder degree than the portions 22 even though the entire unit is subjected to the same vulcanization process.

So far in this description, loop 17 has been described simply as a rubberized fabric endless loop which may be wrapped up to the desired form from either strips of rubberized square woven fabric cut on a bias or from rubberized cord fabric with the cords thereof extending in a peripheral direction. However there is illustrated in Fig. 3 my preferred method of forming this loop 17. A long strip of rubberized cord fabric is wrapped around a suitable form, corresponding to the dimensions and spacing of the metal inserts 20, in such a way that in one web 30 of the loop 17 these cords 18 extend angularly from the right side to the left side (or vice versa) when looking at a transverse section of the unit (as shown in Fig. 2), while in the other web 31 of the loop 17 these cords 18 extend substantially vertically. At the diamond shaped portion 32 of web 30 the alternate plies of the cords 18 extend at opposing angles and therefore cross each other, as will be clearly understood from Fig. 3. Of course during vulcanization of the unit the cords 18 are firmly bonded together at the overlapping portion 32 and thus the cords 18 extending at these opposing angles mutually reinforce and strengthen each other. By this method of wrapping up the loop 17 the cords 18 are made to extend angularly from one side of the unit to the other in order to resist lateral distortion of the molded unit 15, and yet the cords 18 are continuous, that is, the diagonally laid cords are not cut off at the points where they are clamped in place by the inserts 20 and hence a stronger construction is obtained.

The assembling in place of the completed molded unit 15 upon the spring leaf 11 and member 10 will now be described. A metal plate 40 of greater lateral width than spring leaf 11 is fixed upon the projecting end of leaf 11 by the U-shaped rivet 41 whose shanks 42 do not pierce leaf 11 but extend adjacent the sides thereof and through holes in plate 40 and have their ends 43 riveted over on top of plate 40. The lower projecting shank 21 of unit 15 is passed through registering holes 45 and 46 in plate 40 and leaf 11 respectively, and the lock washer 47 and nut 48 applied. When nut 48 is drawn up very tight the clamping insert 20 clamps the casing 16 and loop 17 down tightly upon seat 40 and thus fixes all these parts to the end of leaf 11. Preferably the under side of the tip of plate 40 is ground or tapered off, as shown at 44, to provide a clearance between plate 40 and leaf 11 at this point and thus prevent any down load upon the tip end of leaf 11. This eliminates any possibility of leaf 11 breaking where it is pierced at hole 46 due to a bending load. The construction of this shackle seat 40 is similar to that described and claimed in my copending application Serial No. 179,360 filed March 29, 1927.

A metal plate 50 of the full width of unit 15 is rigidly fixed to the upper member 10 by rivets 51. The upper shank 21 of unit 15 is passed through registering holes 52 and 53 in plate 50 and member 10 respectively and lock washer 54 and nut 55 applied. By tightening nut 55 the upper portion of casing 16 and loop 17 are firmly clamped in non-slipping relation to member 10. Preferably the hole 53 in member 10 is so located relative to the hole 46 in the spring leaf 11 that these holes will be in substantial vertical alignment when spring 12 is deflected to its normal or average position. This position is illustrated in Fig. 1.

In operation, the flexible casing 16 is under tension and retains the elastic rubber blocks 22 and 23 in shape sufficiently to withstand compression loads upon the shackle. The spring end 11 is permitted to move to and fro by a rolling distortion of the unit 15, which rolling distortion will not be materially resisted by the flexible loop 17 since loop 17 can easily swing to and fro without tendency by such swinging to compress the inner soft rubber block 23. Any relative lateral movement in either direction between member 10 and leaf 11 will be resisted primarily by the angularly inclined cords 18 of the web 30 of loop 17 which obviously will be put under direct tension by such movement. Whenever there is any tension load upon the shackle it will be taken primarily by the vertical cords 18 of the web 31 of loop 17. It is thus seen that loop 17 takes the sidewise loads as well as the tension loads upon the unit 15 and so prevents damaging elongation thereof under tension loads and any tendency to lie over on its side under sidewise loads such as occur in turning sharply.

While the form of embodiment of the present invention as herein disclosed, constitutes a preferred form, it is to be understood that other forms might be adopted, all coming within the scope of the claims which follow.

What is claimed is as follows:

1. An extension shackle connecting two relatively movable members, said shackle comprising: a molded unit having a flexible rubberized textile casing vulcanized upon an interior elastic soft rubber block, means for fixing opposite portions of said unit to said movable members respectively, and a separately formed flexible transverse web extending through said rubber block and secured to said movable members respectively.

2. An extension shackle connecting two relatively movable members, said shackle comprising: a molded unit having a flexible rubberized textile casing vulcanized upon an interior elastic soft rubber block, means for fixing opposite portions of said unit to said movable members respectively, and a flexible looped web extending through said rubber block and fixed to said movable members respectively.

3. An extension shackle connecting two relatively movable members, said shackle comprising: a molded unit having a flexible rubberized textile casing vulcanized upon an interior elastic soft rubber block, means for fixing opposite portions of said unit to said movable members respectively, and a flexible looped web extending through said rubber block and fixed to said movable members respectively, the two sides of said loop being spaced apart and elastic rubber vulcanized in place therebetween.

4. An extension shackle connecting two relatively movable members, said shackle comprising: a molded unit having a flexible rubberized textile casing vulcanized upon an interior elastic soft rubber block, means for fixing opposite portions of said unit to said movable members respectively, and a flexible transverse web extending through said rubber block and secured to said movable members respectively, said web having tension resisting threads therein extending transversely at a substantial angle to the center line of said molded unit.

5. An extension shackle connecting two relatively movable members, said shackle comprising: a molded unit having a flexible rubberized textile casing vulcanized upon an interior elastic soft rubber block, means for fixing opposite portions of said unit to said movable members respectively, and a flexible transverse web extending through said rubber block and secured to said movable members respectively, said web having tension resisting threads therein extending diagonally in both directions and crossing the center line of the transverse section of said molded unit.

6. An extension shackle connecting two relatively movable members, said shackle comprising: a molded unit having a flexible rubberized textile casing vulcanized upon an interior elastic soft rubber block, means for fixing opposite portions of said unit to said movable members respectively, and a flexible transverse web extending through said rubber block and secured to said movable members respectively, said web comprising rubberized cords extending at a substantial angle in a transverse direction of said molded unit.

7. An extension shackle connecting two relatively movable members, said shackle comprising: a molded unit having a flexible rubberized textile casing vulcanized upon an interior elastic soft rubber block, means for fixing opposite portions of said unit to said movable members respectively, and a flexible transverse web extending through said rubber block and secured to said movable members respectively, said web comprising rubberized cords extending angularly in both directions transversely of said molded unit.

8. An extension shackle connecting two relatively movable members, said shackle comprising; a molded unit having a flexible rubberized textile casing vulcanized upon an interior elastic soft rubber block, means for fixing opposite portions of said unit to said movable members respectively, and a flexible looped web extending through said rubber block and fixed to said movable members respectively, said looped web comprising rubberized cords extending angularly in both directions transversely of said molded unit.

9. An extension shackle connecting two relatively movable members, said shackle comprising: a molded unit having a flexible rubberized textile casing vulcanized upon an interior elastic soft rubber block, means for fixing opposite portions of said unit to said movable members respectively, and a flexible looped web extending through said rubber block and fixed to said movable members respectively, said looped web comprising rubberized cords, a plurality of which are fixed to the upper movable member on the right side and to the lower movable member on the left side of the vertical center line of the transverse section of said molded unit, and a plurality of which cords are similarly but oppositely fixed to said movable members.

10. An extension shackle connecting two relatively movable members, said shackle comprising: a molded unit having a flexible rubberized textile casing vulcanized upon an interior elastic soft rubber block, means for fixing opposite portions of said unit to said movable members respectively, and a flexible looped web extending through said rubber block and fixed to said movable members respectively, said looped web comprising rubberized cords which extend angularly transversely on one side of said loop and substantially vertically on the opposite side of said loop.

11. An extension shackle connecting two relatively movable members, said shackle comprising: a flexible rubberized fabric casing vulcanized upon an interior elastic rubber block, means for fixing opposite portions of said casing to said movable members respectively, and a flexible transverse loop of rubberized fabric extending through said rubber block and secured to said movable members respectively by said fixing means.

12. An extension shackle connecting two relatively movable members, said shackle comprising: a flexible rubberized fabric casing vulcanized upon an interior elastic rubber block, means for fixing opposite portions of said casing to said movable members respectively, and a flexible transverse loop of rubberized fabric extending through said rubber block and secured to said movable members respectively, said rubberized fabric loop having diagonally extending threads therein which are put under tension by relative lateral movement between said movable members.

In testimony whereof I hereto affix my signature.

RALPH H. CHILTON.